(12) United States Patent
Pantelidou et al.

(10) Patent No.: US 12,731,071 B2
(45) Date of Patent: Sep. 8, 2026

(54) ML UE CAPABILITY AND INABILITY

(71) Applicant: NOKIA TECHNOLOGIES OY, Espoo (FI)

(72) Inventors: Anna Pantelidou, Massy (FR); Cinzia Sartori, Pullach (DE); Malgorzata Tomala, Wroclaw (PL); Hakon Helmers, Sceaux (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 880 days.

(21) Appl. No.: 18/004,570

(22) PCT Filed: Jul. 7, 2020

(86) PCT No.: PCT/EP2020/069071

§ 371 (c)(1),
(2) Date: Jan. 6, 2023

(87) PCT Pub. No.: WO2022/008037

PCT Pub. Date: Jan. 13, 2022

(65) Prior Publication Data

US 2023/0297882 A1 Sep. 21, 2023

(51) Int. Cl.
*G06N 20/00* (2019.01)
*G06F 1/3212* (2019.01)

(52) U.S. Cl.
CPC .......... *G06N 20/00* (2019.01); *G06F 1/3212* (2013.01)

(58) Field of Classification Search
CPC .......................... G06F 11/3055; G06F 1/3212
See application file for complete search history.

(56) References Cited

U.S. PATENT DOCUMENTS

2014/0198708 A1 7/2014 Lee
2019/0220703 A1 7/2019 Prakash et al.
(Continued)

FOREIGN PATENT DOCUMENTS

WO 2012/138083 A2 10/2012
WO 2019/172813 A1 9/2019
(Continued)

OTHER PUBLICATIONS

"New WID on Study on traffic characteristics and performance requirements for AI/ML model transfer in 5GS", 3GPP TSG-SA WG1 Meeting #88, S1-193606, Oppo, Agenda Item: 5, Nov. 18-22, 2019, 3 pages.

(Continued)

*Primary Examiner* — Philip Guyton
*Assistant Examiner* — Sean Kevin McNamara
(74) *Attorney, Agent, or Firm* — Carter, DeLuca & Farrell LLP

(57) ABSTRACT

It is provided a method comprising: checking whether a terminal indicates to a network its capability to execute and/or to train a machine learning model; monitoring whether the terminal is in an inability state; informing the network that the terminal is in the inability state if the terminal indicated the capability and the terminal is in the inability state, wherein, in the inability state, the terminal is not able to execute and/or train the machine learning model, or the terminal is not able to execute and/or train the machine learning model at least with a predefined performance.

1 Claim, 9 Drawing Sheets

(56) References Cited

U.S. PATENT DOCUMENTS

| | | | | |
|---|---|---|---|---|
| 2020/0019854 | A1* | 1/2020 | Abraham | G06N 3/08 |
| 2021/0135963 | A1* | 5/2021 | Yang | H04W 24/10 |
| 2021/0297178 | A1* | 9/2021 | Kim | G06N 3/045 |
| 2021/0342644 | A1* | 11/2021 | Skuin | G06V 10/774 |

FOREIGN PATENT DOCUMENTS

| | | | |
|---|---|---|---|
| WO | 2019/245881 | A1 | 12/2019 |
| WO | 2020/080989 | A1 | 4/2020 |
| WO | 2021/219201 | A1 | 11/2021 |
| WO | 2022/028664 | A1 | 2/2022 |
| WO | 2022/028665 | A1 | 2/2022 |

OTHER PUBLICATIONS

"3rd Generation Partnership Project; Technical Specification Group Radio Access Network; Universal Terrestrial Radio Access (UTRA), Evolved Universal Terrestrial Radio Access (E-UTRA) and Next Generation Radio Access; Radio measurement collection for Minimization of Drive Tests (MDT); Overall description; Stage 2 (Release 16)", 3GPP TS 37.320 V16.0.0, Mar. 2020, pp. 1-34.

"3rd Generation Partnership Project; Technical Specification Group Radio Access Network; NR; Radio Resource Control (RRC) protocol specification (Release 16)", 3GPP TS 38.331 V16.0.0, Mar. 2020, pp. 1-835.

Shalev-Shwartz et al., "Understanding Machine Learning: From Theory to Algorithms", Cambridge University Press, Jul. 2014, 16 pages.

Invitation to pay additional fees received for corresponding Patent Cooperation Treaty Application No. PCT/EP2020/069071, dated Mar. 29, 2021, 14 pages.

International Search Report and Written Opinion received for corresponding Patent Cooperation Treaty Application No. PCT/EP2020/069071, dated May 20, 2021, 22 pages.

"Discussion on architecture and general", 3GPP TSG-RAN RAN2 #122, R2-2306092, Huawei, Agenda Item: 7.16.2.1, May 22-26, 2023, pp. 1-15.

"Discussion on other model control method", 3GPP TSG-RAN WG2 Meeting #122, R2-2305570, Spreadtrum Communications, Agenda item: 7.16.2.4, May 22-26, 2023, 2 pages.

"Discussion on AI/ML Capability Reporting and Model LCM", 3GPP TSG RAN WG2 Meeting #121, R2-230xxxx, Sharp, Agenda Item: 7.16.2.1, May 22-26, 2023, pp. 1-5.

Office action received for corresponding Chinese Patent Application No. 202080102901.5, dated Sep. 30, 2024, 12 pages of office action and no page of translation available.

Office action received for corresponding Chinese Patent Application No. 202080102901.5, dated May 6, 2025, 9 pages of office action and no page of translation available.

Office action received for corresponding China Patent Application No. 202080102901.5, dated Jul. 31, 2025, 9 pages of office action and 10 pages of translation available.

* cited by examiner

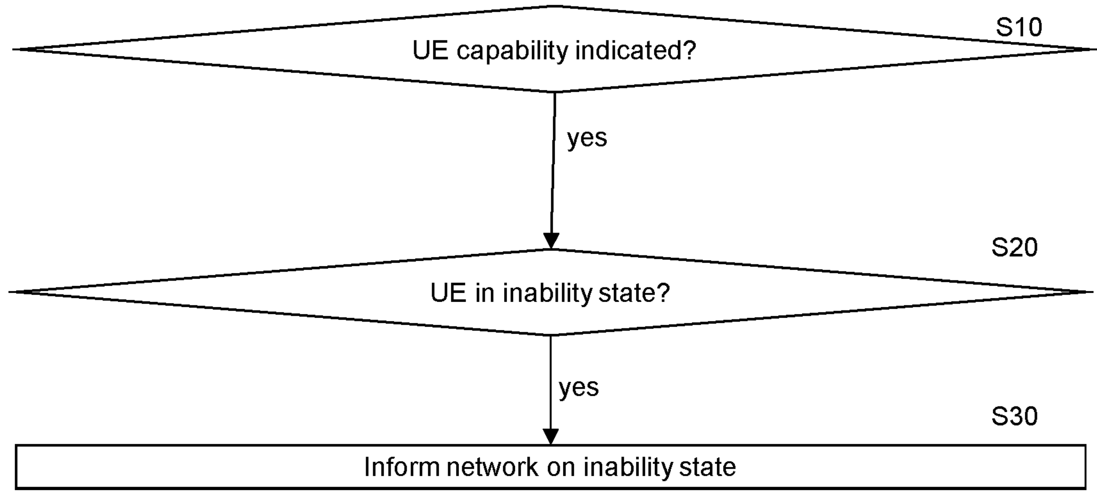
Fig. 9
Fig. 8
Fig. 10
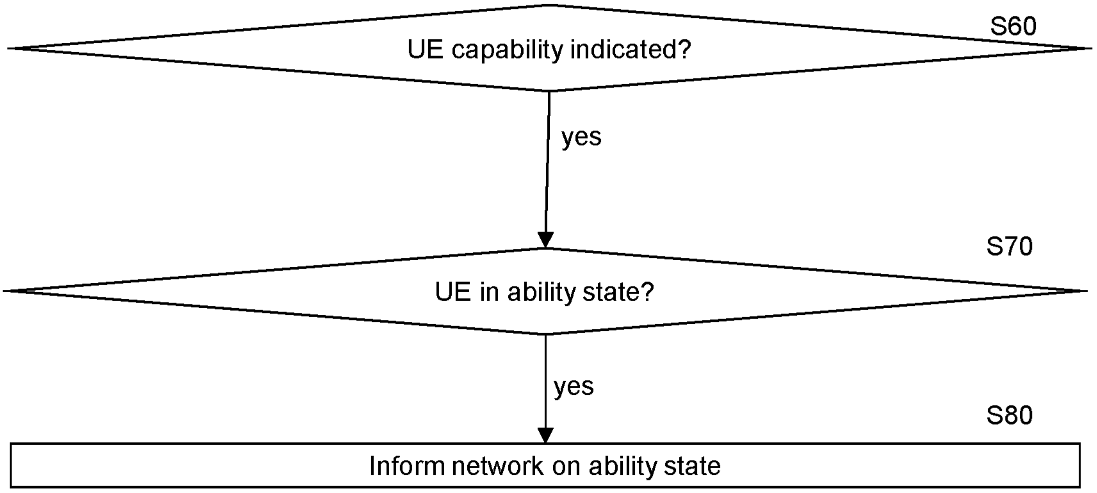
Fig. 11

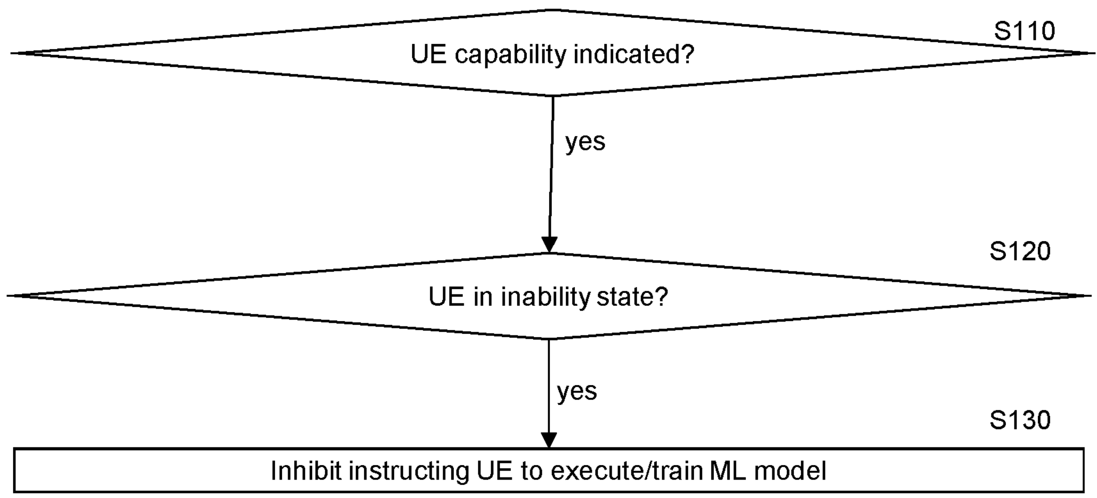
Fig. 13
Fig. 12
Fig. 14
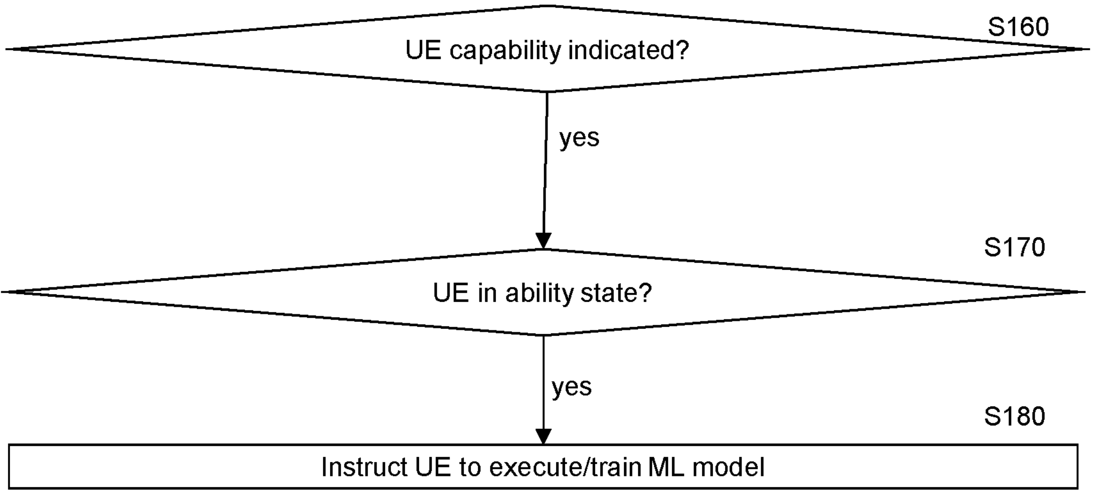
Fig. 15

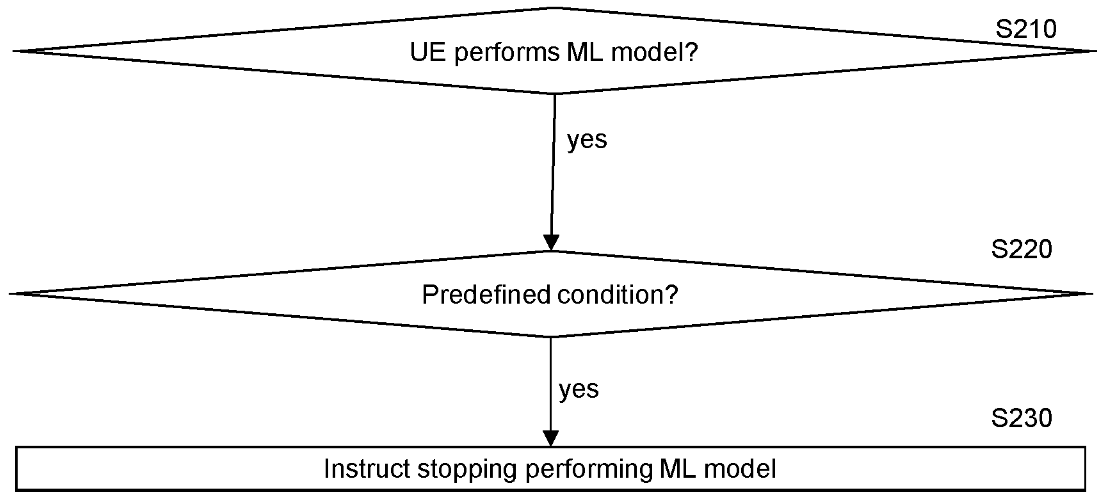
Fig. 17
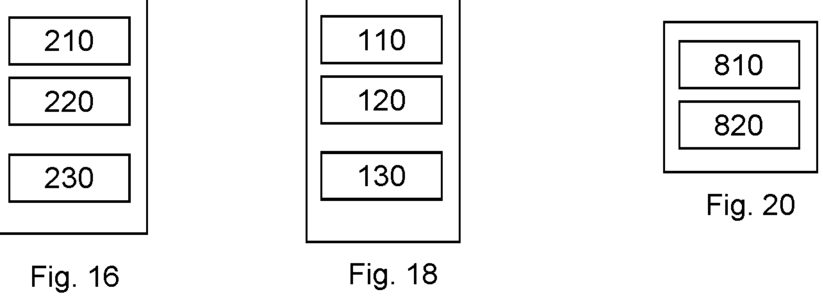
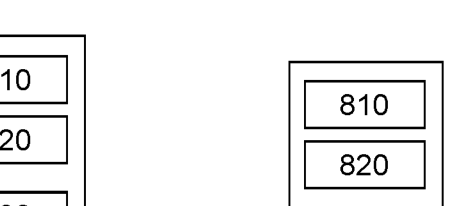
Fig. 16
Fig. 18
Fig. 20
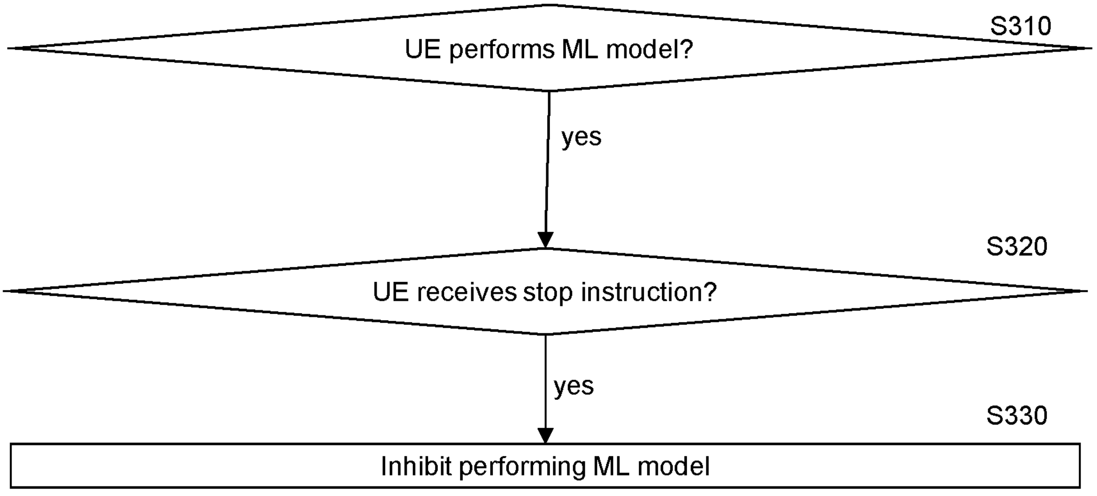
Fig. 19

ML UE CAPABILITY AND INABILITY

CROSS-REFERENCE TO RELATED APPLICATIONS

This application is a national phase entry of International Application No. PCT/EP2020/069071, filed Jul. 7, 2020, the contents of which are hereby incorporated by reference in their entirety.

FIELD OF THE INVENTION

The present disclosure relates to an indication of UE's (in-)ability to execute and/or train a ML model and to network-initiated triggering of execution and/or training of the ML model in view of UE's (in-)ability to execute and/or train a ML model.

Abbreviations

3GPP 3rd Generation Partnership Project
3G/4G/5G 3rd/4th/5th Generation
AI Artificial Intelligence
gNB 5G base station
IAB Integrated Access and Backhauling
IE Information Element
LTE Long-Term Evolution
MDT Minimization of Drive Tests
ML Machine Learning
MTC Machine-Type Communication
RAN Radio Access Network
Rel Release
RRC Radio Resource Control
RRM Radio Resource Management
RSRP Reference Signal Received Power
SA System Architecture
SON Self Optimizing Networks
TS Technical Specification
UE User Equipment

BACKGROUND OF THE INVENTION 5G evolution drives the need to study use cases and to propose potential service requirements for 5G system support of Artificial Intelligence (AI)/Machine Learning (ML). The agreed by 3GPP SA1 Study Item in S1-193606 describes targeted objectives and emphasizes that ML and AI will engage concrete 5G network entities and infrastructure. The way of developing machine learning processes and models already assumes that the 5G traffic and end-user's device will take part in ML model training.

The book by Shai Shalev-Shwartz and Shai Ben-David, "Understanding Machine Learning: From Theory to Algorithms", Cambridge University Press, 2014, describes ML as follows: "As an interdisciplinary field, machine learning shares common threads with the mathematical fields of statistics, information theory, game theory, and optimization. It is naturally a subfield of computer science, as our goal is to program machines so that they will learn. In a sense, machine learning can be viewed as a branch of AI (Artificial Intelligence), since, after all, the ability to turn experience into expertise or to detect meaningful patterns in complex sensory data is a cornerstone of human (and animal) intelligence.". Also, in this book, Machine Learning (ML) is defined as part of automated learning through which computers are programmed so that they can "learn" from input available to them. Learning is defined to be the process of converting experience into expertise or knowledge. The input to a learning algorithm is training data, representing experience, and the output is some expertise, which usually takes the form of another computer program that can perform some task.

3GPP Rel-16 defined 5G features under RAN-centric Data Collection mechanisms enable the operators to monitor and optimise their 5G deployments. In this context, SON and MDT-defined in LTE became the baseline for the newly 5G method of data collection.

Minimization of Drive Test (MDT) is a standardized 3GPP LTE feature which involves commercial UEs for collecting and reporting own measurements to the network [see 3GPP TS 37.320]. The fundamental concept aims at replacing dedicated and costly drive testing performed for network optimization. MDT involves regular users of cellular network and makes usage of their data that are collected anyway (e.g., for mobility purposes). Fundamentally, two MDT reporting approaches are defined: Immediate MDT and Logged MDT. Immediate MDT reporting means that the UE generates a real time report of radio measurements immediately after performing them. In Logged MDT reporting, the configuration is done when UE is in connected mode and the MDT data collection is done at the UE when it enters idle or inactive mode. Deferred reports in a form of logs are then sent when the UE enters connected mode; the UE can indicate measurement availability to the network through an RRC message and the network can obtain the logged reports through the UEInformationRequest/Response procedure.

Thus, the automated data collection in Rel. 16 for 5G inherits the two types of MDT: Immediate and Logged MDT provided methods to deliver real-time measurements (e.g. results of measurements performed for typical RRM operations) and non-real time measurements results taken during the time the UE was not having an active RRC Connection (namely, it was in RRC IDLE state or RRC INACTIVE state) respectively.

Training of AI/ML algorithms requires a big amount of data. Transmission of these data may highly impact the network performance as well as the spectral efficiency (since a big quantity of UE measurements is required by the network) if training of a ML model is performed at the network side. As an alternative, ML model training can be done at the UE in which case the amount of data that needs to be communicated through the interfaces (in particular: the radio interface) is significantly reduced.

The UE may have several Trained ML models locally available. Those trained ML models may be used to solve one or more optimization problems. Furthermore, a UE may have different alternative solutions to solve a certain optimization problem. For instance, the UE may have a non-ML algorithm (that is native in the UE), or it may have one or more different ML algorithms of different complexity and performance.

The ML model execution may be at the UE side, at the network side, or in both. UE may execute the trained ML models it has trained itself locally. In certain cases, a UE may execute locally also trained ML models that have been trained by the network but have been downloaded to the UE.

When the UE executes a ML model, it may or may not further train the ML model. I.e., the UE may further adapt one or more of the learned parameters of the ML model based on the execution of the ML model, or it may keep the parameters of the ML model constant, once they have been learned. The expression "execute and/or train the ML model" covers both of these cases.

PCT/EP2020/061734 "MDT CONFIGURATION FOR ML-MODEL TRAINING AT UE" presents a framework in which the network instructs a UE through an MDT Configuration to locally and autonomously train an ML model. Specifically, they introduced a method for the network to trigger the UE to monitor through measurements or pre-configured 'functions of measurements' the process of learning of the provided ML model, and directly use those measurements to train the ML model. The target output by the UE is the trained ML model.

For example, a UE can be configured by the network to monitor functions of measurements, corresponding to a certain network model/behavior or property, described as: "when the serving cell RSRP is in a certain range", "how many times serving cell RSRP has fallen into predefined range", "when packet delay exceeds a certain threshold", "when interference power received exceeds a certain threshold" to name a few.

If the ML model is executed at the network side, then the UE also reports the trained model (along with the trained accuracy) to the network together with an indication of the ending of the training period. If the ML model is executed at the UE side, then the UE only indicates to network the ending of the ML training period. In both cases, UE may also report to the network (either in real time or based on a log depending on its RRC State) 'only' measurements that lead to a given deviation from the ML model to be observed or trained.

This prior art allows the UE to train one or more ML problems locally. However, in certain situations it may be desired to postpone the execution, for example because other components (e.g., in federated learning) are not yet trained with certain degree of accuracy.

SUMMARY OF THE INVENTION

It is an object of the present invention to improve the prior art.

According to a first aspect of the invention, there is provided an apparatus, comprising one or more processors, and memory storing instructions that, when executed by the one or more processors, cause the apparatus to: check whether a terminal indicates to a network its capability to execute and/or to train a machine learning model; monitor whether the terminal is in an inability state; inform the network that the terminal is in the inability state if the terminal indicated the capability and the terminal is in the inability state, wherein, in the inability state, the terminal is not able to execute and/or train the machine learning model, or the terminal is not able to execute and/or train the machine learning model at least with a predefined performance.

According to a second aspect of the invention, there is provided an apparatus comprising: one or more processors, and memory storing instructions that, when executed by the one or more processors, cause the apparatus to: check whether a terminal indicates to a network its capability to execute and/or to train a machine learning model; monitor whether the terminal is in an ability state; inform the network that the terminal is in the ability state if the terminal indicated the capability and the terminal is in the ability state, wherein, in the ability state, the terminal is able to execute and/or train the machine learning model at least with a predefined performance.

According to a third aspect of the invention, there is provided an apparatus comprising: one or more processors, and memory storing instructions that, when executed by the one or more processors, cause the apparatus to: check whether a terminal indicates its capability to execute and/or to train a machine learning model; monitor if an information is received according to which the terminal is in an inability state; inhibit instructing the terminal to execute and/or train the machine learning model if the terminal indicated its capability and the information is received according to which the terminal is in the inability state, wherein, in the inability state, the terminal is not able to execute and/or train the machine learning model, or the terminal is not able to execute and/or train the machine learning model at least with a predefined performance.

According to a fourth aspect of the invention, there is provided an apparatus comprising: one or more processors, and memory storing instructions that, when executed by the one or more processors, cause the apparatus to: check whether a terminal indicates its capability to execute and/or to train a machine learning model; monitor if an information is received according to which the terminal is in an ability state; instruct the terminal to execute and/or train the machine learning model if the terminal indicated its capability and the information is received according to which the terminal is in the ability state, wherein, in the ability state, the terminal is able to execute and/or train the machine learning model at least with a predefined performance.

According to a fifth aspect of the invention, there is provided an apparatus comprising: one or more processors, and memory storing instructions that, when executed by the one or more processors, cause the apparatus to: monitor if an information is received that a terminal executes and/or trains a machine learning model; supervise if a predefined condition is established; instruct the terminal to stop the executing and/or training the machine learning model if the information was received that the terminal executes and/or trains the machine learning model and the predefined condition is established.

According to a sixth aspect of the invention, there is provided an apparatus comprising: one or more processors, and memory storing instructions that, when executed by the one or more processors, cause the apparatus to: check if a terminal executes and/or trains a machine learning model; monitor if the terminal receives an instruction to stop executing and/or training the machine learning model; inhibit the terminal to execute and/or train the machine learning model if the terminal executes and/or trains the machine learning model and the instruction is received.

According to a seventh aspect of the invention, there is provided a method comprising: checking whether a terminal indicates to a network its capability to execute and/or to train a machine learning model; monitoring whether the terminal is in an inability state; informing the network that the terminal is in the inability state if the terminal indicated the capability and the terminal is in the inability state, wherein, in the inability state, the terminal is not able to execute and/or train the machine learning model, or the terminal is not able to execute and/or train the machine learning model at least with a predefined performance.

According to an eighth aspect of the invention, there is provided a method comprising: checking whether a terminal indicates to a network its capability to execute and/or to train a machine learning model; monitoring whether the terminal is in an ability state; informing the network that the terminal is in the ability state if the terminal indicated the capability and the terminal is in the ability state, wherein, in the ability state, the terminal is able to execute and/or train the machine learning model at least with a predefined performance.

According to a ninth aspect of the invention, there is provided a method comprising: checking whether a terminal indicates its capability to execute and/or to train a machine learning model; monitoring if an information is received according to which the terminal is in an inability state; inhibiting instructing the terminal to execute and/or train the machine learning model if the terminal indicated its capability and the information is received according to which the terminal is in the inability state, wherein, in the inability state, the terminal is not able to execute and/or train the machine learning model, or the terminal is not able to execute and/or train the machine learning model at least with a predefined performance.

According to a tenth aspect of the invention, there is provided a method comprising: checking whether a terminal indicates its capability to execute and/or to train a machine learning model; monitoring if an information is received according to which the terminal is in an ability state; instructing the terminal to execute and/or train the machine learning model if the terminal indicated its capability and the information is received according to which the terminal is in the ability state, wherein, in the ability state, the terminal is able to execute and/or train the machine learning model at least with a predefined performance.

According to an eleventh aspect of the invention, there is provided a method comprising: checking whether a terminal indicates its capability to execute and/or to train a machine learning model; monitoring if an information is received according to which the terminal is in an ability state; instructing the terminal to execute and/or train the machine learning model if the terminal indicated its capability and the information is received according to which the terminal is in the ability state, wherein, in the ability state, the terminal is able to execute and/or train the machine learning model at least with a predefined performance.

According to a twelfth aspect of the invention, there is provided a method comprising: checking if a terminal executes and/or trains a machine learning model;

- monitoring if the terminal receives an instruction to stop executing and/or training the machine learning model; inhibiting the terminal to execute and/or train the machine learning model if the terminal executes and/or trains the machine learning model and the instruction is received.

Each of the methods of the seventh to twelfth aspects may be a method of machine learning.

According to a thirteenth aspect of the invention, there is provided a computer program product comprising a set of instructions which, when executed on an apparatus, is configured to cause the apparatus to carry out the method according to any of the seventh to twelfth aspects. The computer program product may be embodied as a computer-readable medium or directly loadable into a computer.

According to some embodiments of the invention, at least one of the following advantages may be achieved:

- the network may control the UE with respect to executing and/or training a ML model;
- commands from the network to the UE regarding executing and/or training a ML model may be avoided if the UE is not able to execute the command;
- UE may fall back to a Default Behavior if it is not able to execute and/or train a ML model because of its current state.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 8 shows an apparatus according to an embodiment of the invention;

FIG. 9 shows a method according to an embodiment of the invention;

FIG. 10 shows an apparatus according to an embodiment of the invention;

FIG. 11 shows a method according to an embodiment of the invention;

FIG. 12 shows an apparatus according to an embodiment of the invention;

FIG. 13 shows a method according to an embodiment of the invention;

FIG. 14 shows an apparatus according to an embodiment of the invention;

FIG. 15 shows a method according to an embodiment of the invention;

FIG. 16 shows an apparatus according to an embodiment of the invention;

FIG. 17 shows a method according to an embodiment of the invention;

FIG. 18 shows an apparatus according to an embodiment of the invention;

FIG. 19 shows a method according to an embodiment of the invention; and

FIG. 20 shows an apparatus according to an embodiment of the invention.

DETAILED DESCRIPTION OF CERTAIN EMBODIMENTS

Figure 1:
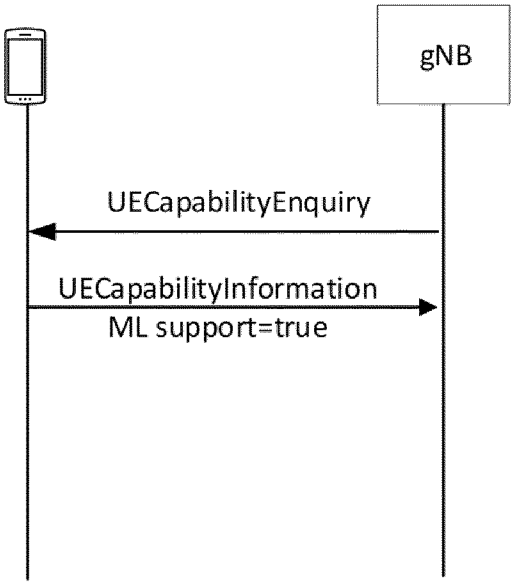
FIG. 1 shows a message exchange about UECapability Information.

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

When ML model is executed and/or trained at the UE side, UE may have one or more trained models available to solve a certain problem. UE may additionally have a non- ML algorithm implemented internally (e.g. native in the UE). Network should be able to instruct the UE which model the UE should use at any given time and when to activate this model.

On the other hand, the UE should be able to indicate to the network whether it is an ML capable UE or not. In addition, even if a UE has indicated to the network that it is ML capable, it is possible that the UE becomes unable to perform ML in the course of time if it detects for example that its battery level has dropped under a certain threshold or if its memory is getting full, to name a few examples. Thus, a UE should be able to dynamically indicate its current ML ability to the network. In the present application, inability of the UE includes not only the case that the UE is not able to execute and/or train the ML model at all, but also a case that the UE is able to execute and/or train the ML model, but with a performance below a predefined (desired) performance.

Currently, in the prior art, mechanisms are not known that activate a trained ML model for execution at the UE. Furthermore, currently, there are no mechanisms that allow the UE to indicate how to operate in case it is not able to execute ML at its given state.

Within the present application, the terms "capability"/"capable"/"incapability"/"incapable" etc. indicate a static property of the UE related to the resources (such as battery, memory, processing power) the UE is equipped with. The terms "ability"/"able"/"inability"/"unable" etc. indicate a dynamic property with respect to these resources, namely if the UE currently has sufficient resources available to execute and/or train the ML model. The ability (also denoted as "ML ability") may be considered as a dynamic state of the UE.

According to some example embodiments, it is assumed that the 5G UE and gNB are capable of operating with a support of ML models. One or more trained ML models may be available at the UE to perform a certain task/to solve a certain problem. The UE is also allowed to use a non-ML algorithm to perform the given task/solve the given problem.

In addition, it is assumed that:

- Models can be trained at the network and downloaded at the UE side
- Models can be trained at the UE itself.
- A mixture of models trained at the network and at the UE can be available at the UE side According to some example embodiments of the invention, one or more of the following functions are provided to manage and/or coordinate ML model execution and/or training:

- ML UE ability and UE Default Behavior indication to the network: The UE indicates to the network its ability to execute an ML model at a given time. The ML model execution related ability is different from existing static UE capabilities since it can vary with time and depends not only on UE type, but also on the current UE ability (power, memory, etc.). Additionally, the UE may indicate to the network a Default Behavior to which it falls back when UE is not able to execute and/or train the ML model. The Default Behavior may also depend on UE type and ability (power, memory, etc.).
- A network-based ML activation of a trained ML model for execution and/or training: Network can activate one (out of multiple trained ML models) available at the UE for a given task/problem.
- A network-based ML deactivation of a ML model in execution/training at UE: The network detects that the ML model is suboptimal for a given task/problem and de-activates it. UE falls back to Default Behavior until network activates a (potentially different) ML model for the task/problem to be solved.

UE indication at any time to the network of its (in-)ability to execute and/or train an ML model if its state does not allow (full) ML processing. The UE may indicate its inability to the network on its own (either periodically or trigger-based, i.e. when the UE becomes unable to execute and/or train the ML model), or the network may request the UE to provide an indication of its (in-)ability.

There are different methods with which the UE may indicate its ML ability to the network. A mere reuse of the UE capability IE is insufficient to capture ML ability since it is a static field indicated once to the network during the registration process to inform all the details of the UE capabilities. UE capability IE can indicate whether the UE has the capability to execute (or even train itself) an ML algorithm, i.e., whether or not it is equipped with the necessary resources. In addition, according to some example embodiments, a UE is able to indicate its ML ability in the course of time. An ML capable UE may become unable to execute the trained model if its current state does not allow it, e.g., if its memory is getting full, or if its battery drops below a threshold, or ML performance overspends processing capabilities of the UE processor.

Option a: Re-Use Existing UE Capability IE Together with a New IE (e.g. "ML State Indication")

UE may reuse existing UE Capability Information Elements extended by an additional indication whether or not the UE is able to execute and/or train an ML model. As shown in FIG. 1, in response to a UECapabiltyEnquiry from the gNB, the UE replies with UECapabilityInformation which comprises the IE "MLsupport". "MLsupport=true" indicates that the UE is equipped with the necessary resources (in particular: hardware) to execute and/or train an ML model, i.e. that the UE is capable to execute and/or train the ML model.

Figure 2:
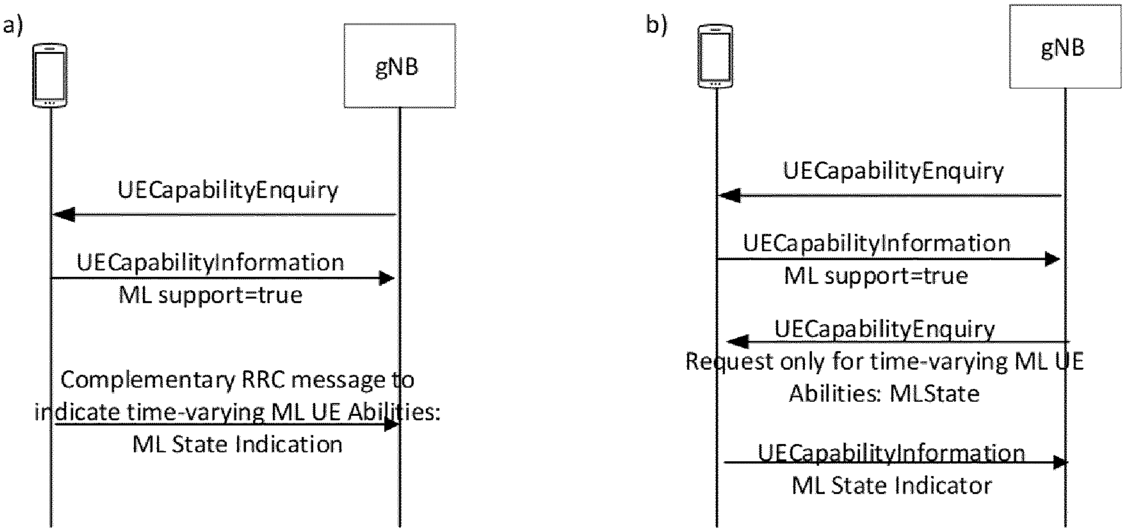
FIG. 2 shows two different message exchange options for informing the network on static UE capabilities and time-varying UE's ML ability.

In addition, according to some example embodiments, the UE indicates to the network a new IE (e.g. "ML State Indication" IE). This "ML State Indication" IE is not static (i.e. the gNB does not interpret this is a constant UE readiness), but reflects the ability of the UE to execute and/or train a ML model at a given state/moment. Unlike static UECapabilityInformation IE, "ML State Indication" is a time-dependent (dynamic) indication. It is complementing information to the generic UE capabilities (the static ones). The UE may provide "ML State Indication" either with a message separate from UECapabilityInformation (as shown FIG. 2*a*) or by an extended UE Capability procedure. For example, as shown in FIG. 2*b*, the extended UE Capability procedure may be triggered by the generic ML support indication. Upon receipt of the ML support indication (indicating that the UE is capable to execute and/or train the ML model), gNB may request the UE for its (time dependent) ML ability. For example, in this second request, gNB may request information only on time dependent ML State Indication. However, in some example embodiments, gNB may request a state of static properties, too.

The ML ability may be a single Boolean value ("yes" or "no"), or it may comprise several Boolean values for different resources (e.g. Memory: "able", Battery power: "not able"). Such Boolean values may be indicated for each of plural ML models or classes of ML models. In some example embodiments, ML ability may comprise numerical values (e.g. Available Memory: 50% (provided that the total memory is known to the gNB, e.g. as part of the UECapabilityInformation) or Available Memory: 3.8 GB) such that the gNB may determine from the numerical values the ability of the UE to execute and/or train a certain ML model. The types of indications may be mixed, e.g. Battery power: "yes", Memory: 7.2 GB).

Once the UE detects internally constrains and limitations to continue with the previously declared "ML State Indication", e.g. due to demanding processing operations on running ML model training, UE may send a different value of its ability to gNB. In line with the change of the "ML State Indication" value, the UE may also update its Default Behavior for a given task/problem and inform the network thereabout. The Default Behavior may not be a unique behavior through the course of time of UE operation and may depend on the UE state. For instance, a UE, at times when its memory is full, can indicate to the network that its default behaviour is to "run non-ML algorithm" for a certain task but if later on in time its state changes it can indicate that it is ready to "run light ML algorithm" for the task.

Option b: Define a New Time-Varying ML UE Ability IE

Figure 3:
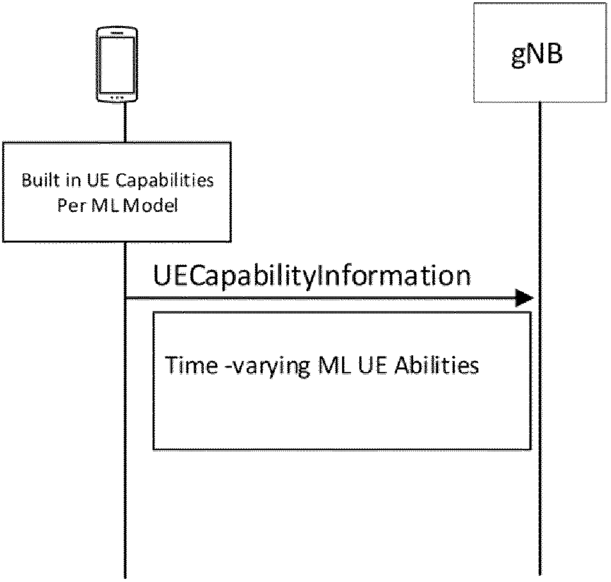
FIG. 3 shows a message exchange to inform the network about time-varying UE's ML ability.

According to some example embodiments, UE may provide a radio capabilities ML UE Ability IE. UE may provide this IE separately from the UECapability procedure discussed with respect to option a. It indicates the (time-dependent) ability of the UE to execute and/or train an ML model. This IE may be tailored to specific problems/algorithms/ML models that the UE is expected to execute and/or train. Option b is illustrated in FIG. 3.

Unlike existing UE Capabilities IE, this IE indicates UE's ability to execute and/or train ML at a given time depending on the UE state and device type. In addition, in some example embodiments, through this IE, the UE may update its Default Behavior for a given problem and inform the network thereabout.

In some example embodiments, UE may indicate its ML ability at any time. In some example embodiments, UE may indicate its ML ability periodically and/or if the ML ability changes (from able to unable or vice versa) and/or based on some other trigger. The UE ML ability may change to reflect the actual UE readiness to act (execute and/or train) on the ML model.

In some example embodiments, only one of options a and b is implemented. In some example embodiments, both options a and b are implemented.

Additionally, in some example embodiments, the UE may indicate to the network its Default Behavior associated to an ML model (that is related to a certain optimization problem), to which it falls back when ML execution and/or training is not possible (UE is unable for ML).

- The Default Behavior may depend on UE type. For example, a UE being part of an IAB node (also called as IAB MT) may be more powerful. On the contrary, an MTC device may be less powerful than a regular UE. Thus, it may have a different Default Behavior than a simple smartphone.
- The Default Behavior may be static or time-dependent. In the latter case, it may vary with the UE state (processing power, memory, etc.).

For instance, Default Behavior for a (simple) smartphone may be the usage of a non ML algorithm to solve a problem. Default Behavior for an IAB MT may be usage of a "Light ML" algorithm. An example of Light ML algorithm for localization use cases comprises a simple algorithm that estimates location based on beam information and RSRP values. This algorithm will require less measurements (and types of measurements to be trained) and will be simpler to be executed as opposed to a more elaborate algorithm that calculates location using additionally (besides RSRP and beam information) an Angle of Arrival, Angle of Departure, sensor measurements, etc.

By means of the next Figures, some example embodiments of the present invention are explained at greater detail.

Figure 4:
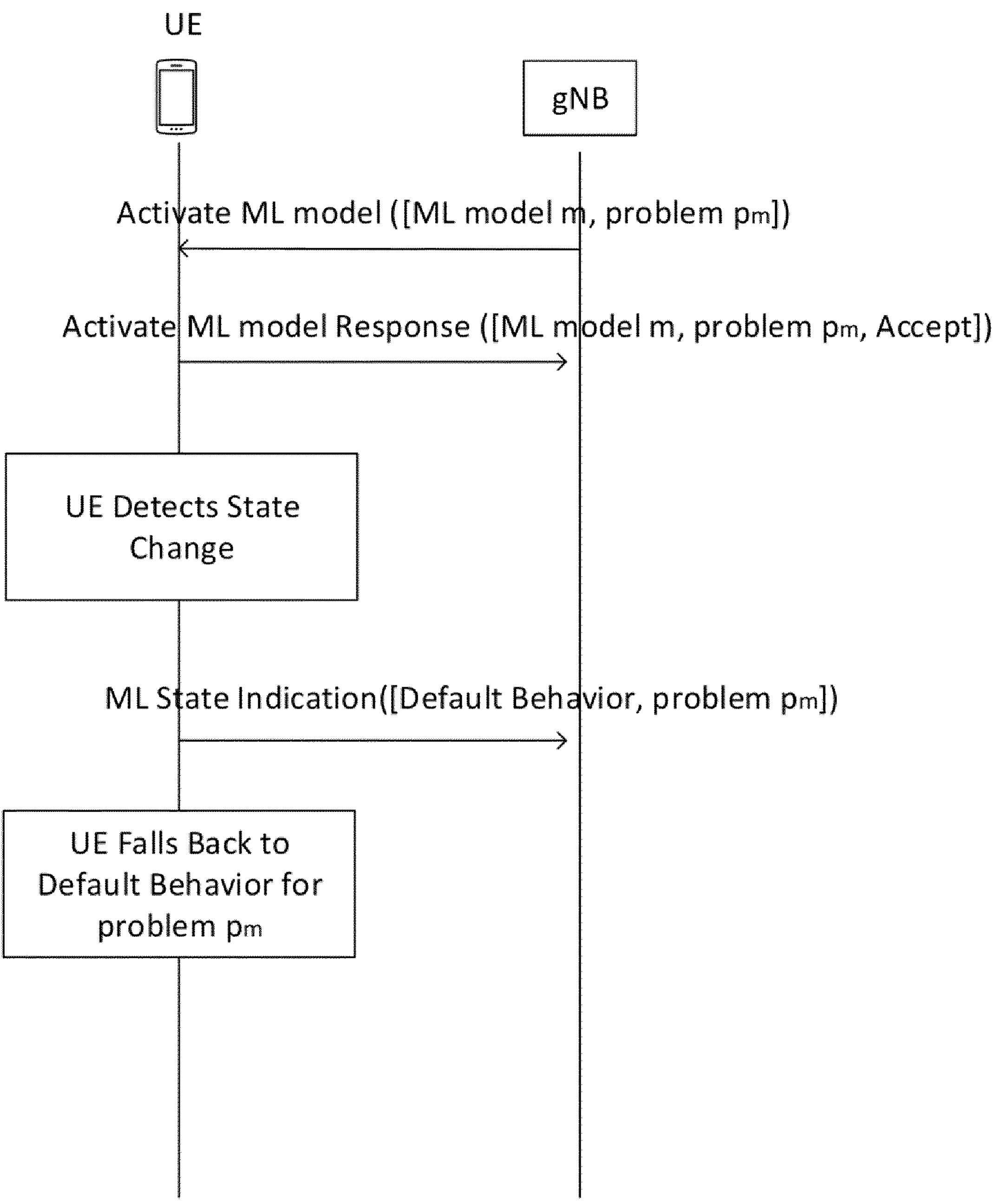
FIG. 4 shows a message flow according to some example embodiments of the invention.

In the example of FIG. 4 the UE is initialized and has indicated to network its ML capabilities and Default Behavior. The UE has x trained ML models (ML model 1, 2, . . . , x) and a non-ML algorithm available (native in the UE). At initialization, it is assumed that the UE is able to execute and/or train the ML models.

As shown in FIG. 4, network (gNB) sends to UE a message "Activate ML model" with which network activates a ML model (e.g., ML model m) to solve a certain problem $p_m$. The model chosen by the network depends on the previously indicated ML capability of the UE. If the UE informed the network on its ML ability (either by Option a or by Option b), the choice of the ML model depends on the ML ability, too. Network may also activate multiple ML models, each related to a different problem with a single activation message (Activate ML model). To activate an ML model at the UE

- MDT procedures can be used with an ML "activation" field in the configuration by the network to the UE. If MDT is used, both Signaling based MDT, initiated from the core network and targeting a specific UE, as well as management-based MDT, targeting a set of UEs in a certain area are applicable; or alternatively or in addition
- RRC Signaling may be used.

One can have different Activation types of an ML model. Activation can be:

- Time based (activate ML model at a certain time configured by the network). A special case of this is to activate the ML model at reception of the Activation message. Alternatively, a time indication (timer) in the message can tell the UE to activate a trained ML model for execution and/or training with some time delay after reception of the Activation message.
- Trigger based (activate the ML model based on some event at the UE configured by the network). This Activation mode could be triggered if a certain event/measurement is observed by the UE. For instance, the UE can activate the ML model if the UE measures that its throughput drops below a threshold or if the number of handover failures (at a certain location) exceeds a certain threshold. Alternatively, this trigger can be based on the internal state of the UE, namely if the UE wants to optimize internal parameters).

In the example of FIG. 4 the UE accepts the activation.

At some point in time, UE detects a State Change that affects its ability to execute and/or train the ML model. In this situation, the UE can declare to the network it is not able for full ML processing (for instance using Option a or Option b), and UE autonomously falls back to Default Behavior.

Figure 5:
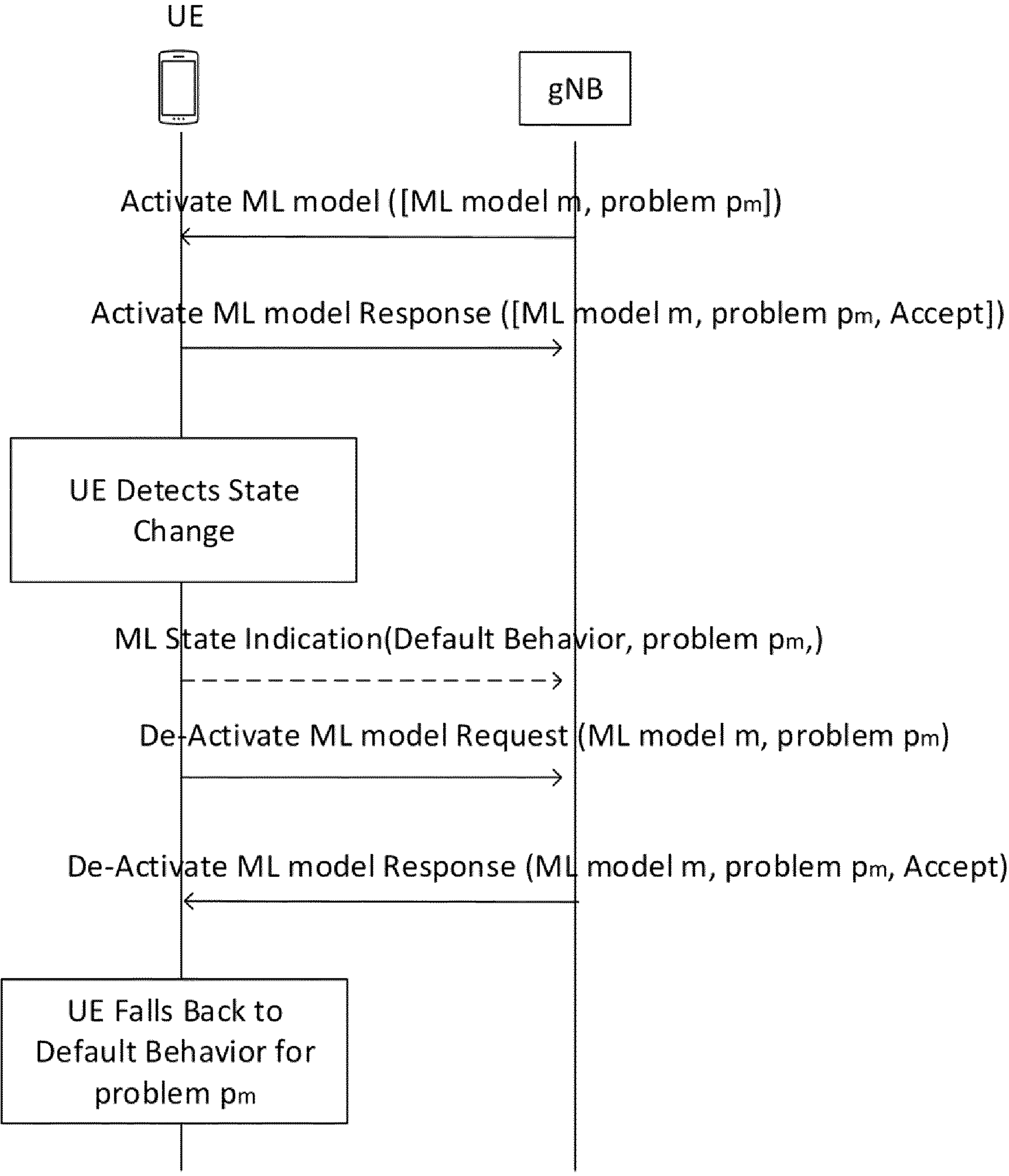
FIG. 5 shows a message flow according to some example embodiments of the invention.

In the example of FIG. 5, activation of an ML model and detecting the UE state change are the same as in the example of FIG. 4. However, differently than in FIG. 4, if the UE detects its state change (inability to execute and/or train the ML model), the UE requests from the network (with a De-Activate ML model Request message) to be switched to a different operation. Optionally, the UE may additionally send an ML State Indication message to the network to inform the network about updating its Default Behavior for the problem $p_m$. This can be the case when the UE detects it is not capable for full ML processing for the current state.

The network acknowledges the request in the De-Activate ML model Response message. With this message the UE can be switched to its Default Behavior for a given problem $p_m$. UE may have a different Default Behavior per problem.

Figure 6:
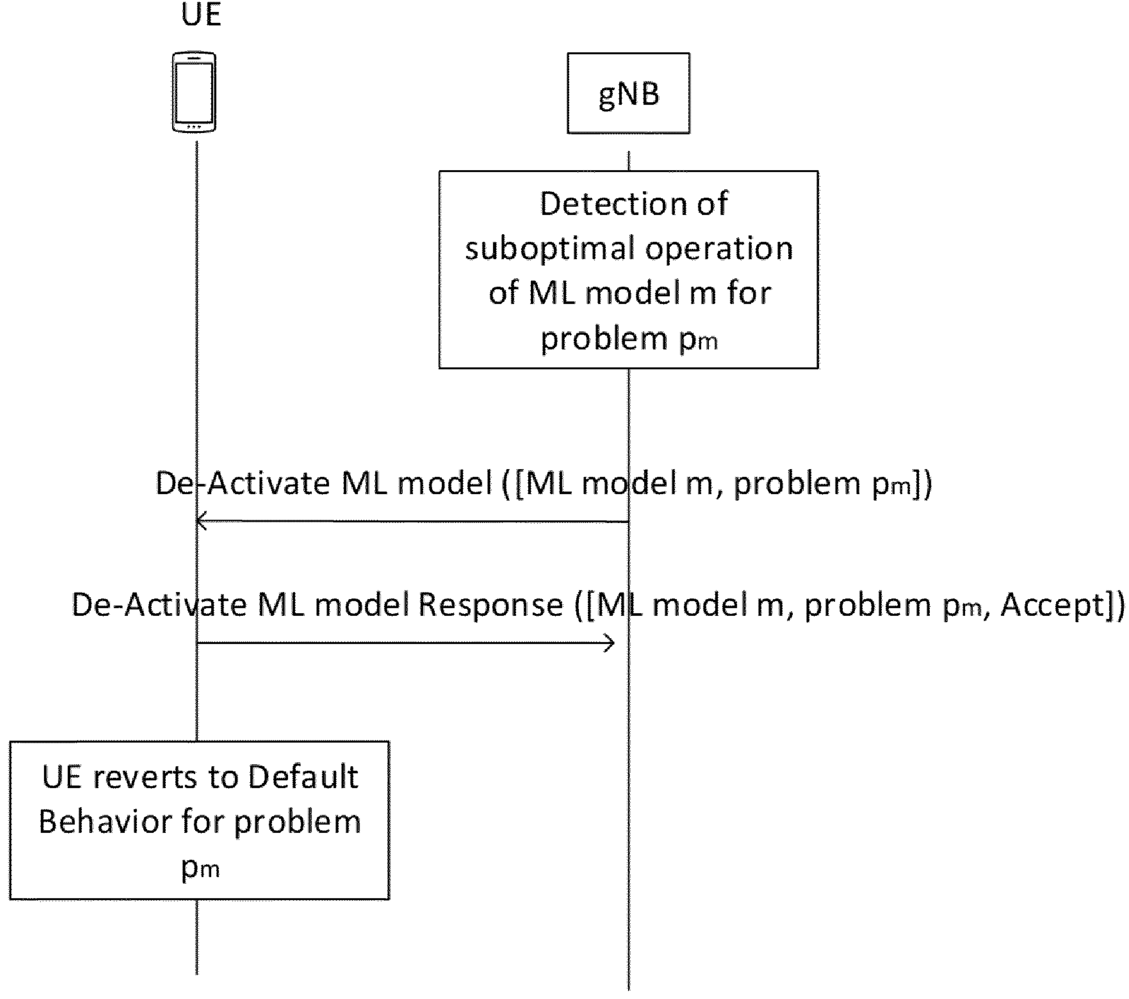
FIG. 6 shows a message flow according to some example embodiments of the invention.

FIG. 6 shows an example where the network detects that the current ML model used by the UE is suboptimal. This can be the case if the network observes that the current ML model does not perform well, for example if the network conditions have changed. In this case, as shown in FIG. 6, the network upon detection of suboptimal operation of ML model m for a given problem $p_m$, sends a De-Activate ML model message to the UE. The network may signal to the UE to De-Activate multiple ML models related to different problems. The UE receiving the De-Activate ML model message reverts to Default Behavior for all the indicated problems and acknowledges the deactivation with an "Accept" Response to the network. The De-Activation message can be done through:

A modified MDT configuration. An ML "deactivation" field can be used in the configuration by the network to the UE. Both Signaling-based MDT, initiated from the core network and targeting a specific UE, as well as management-based MDT, targeting a set of UEs in a certain area are applicable; or alternatively or in addition to RRC signaling.

Another trigger to de-activate the ML model in the UE may be an input from the operator. For example, the operator may have decided that the UE should not execute and/or train the ML model any more.

Figure 7:
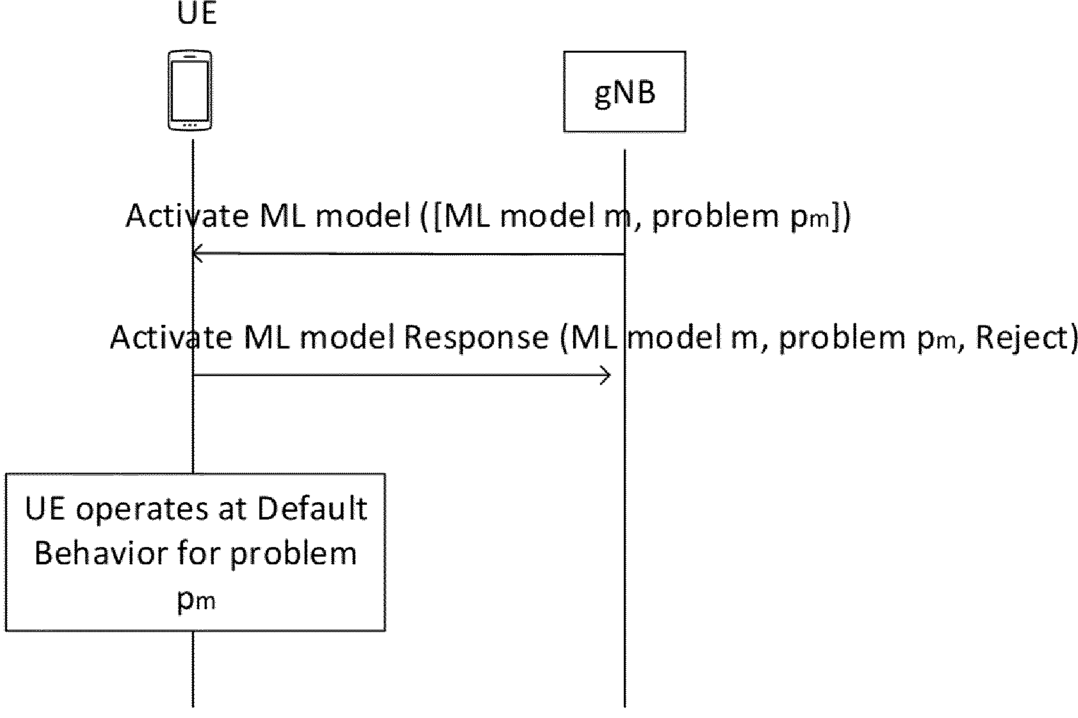
FIG. 7 shows a message flow according to some example embodiments of the invention.

In the example of FIG. 7, the UE rejects the Activation of an ML model by the network if it is not able to execute and/or train the ML model. This situation may happen, for example, if the UE state has changed but the network tried to activate an ML model before the UE sent the state change (and potentially updated its Default Behavior).

FIG. 8 shows an apparatus according to an embodiment of the invention. The apparatus may be a terminal, such as a UE or MTC device, or an element thereof. FIG. 9 shows a method according to an embodiment of the invention. The apparatus according to FIG. 8 may perform the method of FIG. 9 but is not limited to this method. The method of FIG. 9 may be performed by the apparatus of FIG. 8 but is not limited to being performed by this apparatus.

The apparatus comprises means for checking 10, means for monitoring 20, and means for informing 30. The means for checking 10, means for monitoring 20, and means for informing may be a checking means, monitoring means, and informing means, respectively. The means for checking 10, means for monitoring 20, and means for informing 30 may be a checker, monitor, and an informer, respectively. The means for checking 10, means for monitoring 20, and means for informing 30 may be a checking processor, monitoring processor, and informing processor, respectively.

The means for checking 10 checks whether a terminal indicates to a network its capability to execute and/or to train a machine learning model (S10). A terminal is capable to execute and/or to train the machine learning model if it is equipped with sufficient resources such as battery power, memory, or processing power.

The means for monitoring 20 monitors whether the terminal is in an inability state (S20). In the inability state, the terminal is not able to execute and/or train the machine learning model, or is not able to execute and/or train the machine learning model with a predefined performance. The inability state is a dynamic property.

S10 and S20 may be performed in an arbitrary sequence. They may be performed fully or partly in parallel. In some example embodiments, S20 is not executed if the terminal does not indicate that it is capable to execute and/or to train the machine learning model because the dynamic ability may be irrelevant in this case.

If the terminal indicated the capability (S10=yes) and the terminal is in the inability state (S20=yes), the means for informing 30 informs the network that the terminal is in the inability state (S30).

In FIGS. 8 and 9, it may be assumed as a default, that a UE indicating its capability to execute and/or train the ML model is able to execute and/or train the ML model, too, unless the UE indicates its inability. In contrast, in FIGS. 10 and 11, it may be assumed as a default, that a UE indicating its capability to execute and/or train the ML model is not able to execute and/or train the ML model, unless the UE indicates its ability.

FIG. 10 shows an apparatus according to an embodiment of the invention. The apparatus may be a terminal, such as a UE or MTC device, or an element thereof. FIG. 11 shows a method according to an embodiment of the invention. The apparatus according to FIG. 10 may perform the method of FIG. 11 but is not limited to this method. The method of FIG. 11 may be performed by the apparatus of FIG. 10 but is not limited to being performed by this apparatus.

The apparatus comprises means for checking 60, means for monitoring 70, and means for informing 80. The means for checking 60, means for monitoring 70, and means for informing 80 may be a checking means, monitoring means, and informing means, respectively. The means for checking 60, means for monitoring 70, and means for informing 80 may be a checker, monitor, and an informer, respectively. The means for checking 60, means for monitoring 70, and means for informing 80 may be a checking processor, monitoring processor, and informing processor, respectively.

The means for checking 60 checks whether a terminal indicates to a network its capability to execute and/or to train a machine learning model (S60). A terminal is capable to execute and/or to train the machine learning model if it is equipped with sufficient resources such as battery power, memory, or processing power.

The means for monitoring 70 monitors whether the terminal is in an ability state (S70). In the ability state, the terminal is able to execute and/or train the machine learning model at least with a predefined performance. The ability state is a dynamic property.

S60 and S70 may be performed in an arbitrary sequence. They may be performed fully or partly in parallel. In some example embodiments, S70 is not executed if the terminal does not indicate that it is capable to execute and/or to train the machine learning model because the dynamic ability may be irrelevant in this case.

If the terminal indicated the capability (S60=yes) and the terminal is in the ability state (S70=yes), the means for informing 80 informs the network that the terminal is in the ability state (S80).

FIG. 12 shows an apparatus according to an embodiment of the invention. The apparatus may be a base station, such as gNB or eNB, or an element thereof. FIG. 13 shows a method according to an embodiment of the invention. The apparatus according to FIG. 12 may perform the method of FIG. 13 but is not limited to this method. The method of FIG. 13 may be performed by the apparatus of FIG. 12 but is not limited to being performed by this apparatus.

The apparatus comprises means for checking 110, means for monitoring 120, and means for inhibiting 130. The means for checking 110, means for monitoring 120, and means for inhibiting 130 may be a checking means, monitoring means, and inhibiting means, respectively. The means for checking 110, means for monitoring 120, and means for inhibiting 130 may be a checker, monitor, and an inhibitor, respectively. The means for checking 110, means for monitoring 120, and means for inhibiting 130 may be a checking processor, monitoring processor, and inhibiting processor, respectively.

The means for checking 110 checks whether a terminal indicates its capability to execute and/or to train a machine learning model (S110). A terminal is capable to execute and/or to train the machine learning model if it is equipped with sufficient resources such as battery power, memory, or processing power.

The means for monitoring 120 monitors if an information is received according to which the terminal is in an inability state (S120). In the inability state, the terminal is not able to execute and/or train the machine learning model, or is not able to execute and/or train the machine learning model with a predefined performance. The inability state is a dynamic property.

S110 and S120 may be performed in an arbitrary sequence. They may be performed fully or partly in parallel. In some example embodiments, S120 is not executed if the terminal does not indicate that it is capable to execute and/or to train the machine learning model because the dynamic ability may be irrelevant in this case.

If the terminal indicated the capability (S110=yes) and the terminal is in the inability state (S120=yes), the means for inhibiting 130 inhibits instructing the terminal to execute and/or train the machine learning model (S130), i.e., if these conditions are fulfilled, the ML model is not activated in the UE.

In FIGS. 12 and 13, it may be assumed as a default, that a UE indicating its capability to execute and/or train the ML model is able to execute and/or train the ML model, too, unless the UE indicates its inability. In contrast, in FIGS. 14 and 15, it may be assumed as a default, that a UE indicating its capability to execute and/or train the ML model is not able to execute and/or train the ML model, unless the UE indicates its ability.

FIG. 14 shows an apparatus according to an embodiment of the invention. The apparatus may be a base station, such as gNB or eNB, or an element thereof. FIG. 15 shows a method according to an embodiment of the invention. The apparatus according to FIG. 14 may perform the method of FIG. 15 but is not limited to this method. The method of FIG. 15 may be performed by the apparatus of FIG. 14 but is not limited to being performed by this apparatus.

The apparatus comprises means for checking 160, means for monitoring 170, and means for inhibiting 180. The means for checking 160, means for monitoring 170, and means for inhibiting 180 may be a checking means, monitoring means, and inhibiting means, respectively. The means for checking 160, means for monitoring 170, and means for inhibiting 180 may be a checker, monitor, and an inhibitor, respectively. The means for checking 160, means for monitoring 170, and means for inhibiting 180 may be a checking processor, monitoring processor, and inhibiting processor, respectively.

The means for checking 160 checks whether a terminal indicates its capability to execute and/or to train a machine learning model (S160). A terminal is capable to execute and/or to train the machine learning model if it is equipped with sufficient resources such as battery power, memory, or processing power.

The means for monitoring 170 monitors if an information is received according to which the terminal is in an ability state (S170). In the ability state, the terminal is able to execute and/or train the machine learning model with a predefined performance. The ability state is a dynamic property.

S160 and S170 may be performed in an arbitrary sequence. They may be performed fully or partly in parallel. In some example embodiments, S170 is not executed if the terminal does not indicate that it is capable to execute and/or to train the machine learning model because the dynamic ability may be irrelevant in this case.

If the terminal indicated the capability (S160=yes) and the terminal is in the ability state (S170=yes), the means for inhibiting 180 instructs the terminal to execute and/or train the machine learning model (S180), i.e., if these conditions are fulfilled, the ML model is activated in the JE.

FIG. 16 shows an apparatus according to an embodiment of the invention. The apparatus may be a base station, such as a gNB or eNB, or an element thereof. FIG. 17 shows a method according to an embodiment of the invention. The apparatus according to FIG. 16 may perform the method of FIG. 17 but is not limited to this method. The method of FIG. 17 may be performed by the apparatus of FIG. 16 but is not limited to being performed by this apparatus.

The apparatus comprises means for monitoring 210, means for supervising 220, and means for instructing 230. The means for monitoring 210, means for supervising 220, and means for instructing 230 may be a monitoring means, supervising means, and instructing means, respectively. The means for monitoring 210, means for supervising 220, and means for instructing 230 may be a monitor, supervisor, and an instructor, respectively. The means for monitoring 210, means for supervising 220, and means for instructing 230 may be a monitoring processor, supervising processor, and instructing processor, respectively.

The means for monitoring 210 monitors if an information is received that a terminal executes and/or trains a machine learning model (S210). In other terms, the information indicates that the terminal performs the ML model. For example, such information may be an activation of the ML model in the terminal (e.g. UE) by a base station (e.g. gNB).

The means for supervising 220 supervises if a predefined condition is established (S220). Such a predefined condition may be e.g. an operation of the terminal is poorer than expected; or an input of the operator of the network.

S210 and S220 may be performed in an arbitrary sequence. They may be performed fully or partly in parallel. In some example embodiments, S220 is not executed if the information is not received that the terminal executes and/or trains the machine learning model because the predefined condition may be irrelevant in this case.

If the information was received that the terminal executes and/or trains the machine learning model (S210=yes) and the predefined condition is established (S220=yes), the means for instructing 230 instructs the terminal to stop the executing and/or training the machine learning model (S230).

FIG. 18 shows an apparatus according to an embodiment of the invention. The apparatus may be a terminal, such as a UE or an MTC device, or an element thereof. FIG. 19 shows a method according to an embodiment of the invention. The apparatus according to FIG. 18 may perform the method of FIG. 19 but is not limited to this method. The method of FIG. 19 may be performed by the apparatus of FIG. 18 but is not limited to being performed by this apparatus.

The apparatus comprises means for checking 310, means for monitoring 320, and means for inhibiting 330. The means for checking 310, means for monitoring 320, and means for inhibiting 330 may be a checking means, monitoring means, and inhibiting means, respectively. The means for checking 310, means for monitoring 320, and means for inhibiting 330 may be a checker, monitor, and an inhibitor, respectively. The means for checking 310, means for monitoring 320, and means for inhibiting 330 may be a checking processor, monitoring processor, and inhibiting processor, respectively.

The means for checking 310 checks if a terminal executes and/or trains a machine learning model (S310). In other terms, the information indicates that the terminal performs the ML model.

The means for monitoring 320 monitors if the terminal receives an instruction to stop executing and/or training the machine learning model (S320).

S310 and S320 may be performed in an arbitrary sequence. They may be performed fully or partly in parallel. In some example embodiments, S320 is not executed if the information is not received that the terminal executes and/or trains the machine learning model because the predefined condition may be irrelevant in this case.

If the terminal executes and/or trains the machine learning model (S310=yes) and the instruction is received (S320=yes), the means for inhibiting 330 inhibits the terminal to execute and/or train the machine learning model (S330).

FIG. 20 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 9, 11, 13, 15, 17, and 19 and related description.

Some example embodiments of the invention are described, according to which the (in-)ability indication indicates the ability of the UE to execute and/or train the ML model. In some example embodiments, different indications may be related to the (in-)ability to execute the ML model without training the ML model and to the (in-)ability to train the ML model. In some example embodiments, only one of these indications may be employed.

Some example embodiments of the invention are described where the UE indicates its inability to execute and/or train an ML model. That is, in some example embodiments, it is assumed that the UE is able to execute and/or train an ML model unless it indicates its inability. In some example embodiments of the invention, the UE may indicate its ability to execute and/or train an ML model. That is, in some example embodiments, it is assumed that the UE is not able to execute and/or train an ML model unless it indicates its ability. In some example embodiments of the invention, the UE may indicate both its ability and its inability to execute and/or train an ML model.

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality.

A terminal may be e.g. a mobile phone, a smartphone, a MTC device, a laptop, etc. The user may be a human user or a machine (e.g. in machine-type communication (MTC)).

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

According to the above description, it should thus be apparent that example embodiments of the present invention provide, for example, a terminal such as a UE or an MTC device, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, an access network such as a RAN, or a component thereof (e.g. eNB or gNB), an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. Apparatus comprising:

one or more processors, and memory storing instructions that, when executed by the one or more processors, cause the apparatus to:

check whether a terminal indicates to a network its capability to execute and to train a machine learning model;

monitor whether the terminal is in an inability state or an ability state;

inform the network that the terminal is in the inability state if the terminal indicated the capability and the terminal is in the inability state, wherein, in the inability state, the terminal is not able to execute and train the machine learning model, or the terminal is not able to execute and train the machine learning model at least with a predefined performance;

inform the network that the terminal is in the ability state if the terminal indicated the capability and the terminal is in the ability state, wherein, in the ability state, the terminal is able to execute and train the machine learning model at least with the predefined performance;

update, by the terminal, a default behavior associated with the machine learning model when the inability state is detected, wherein the updating the default behavior comprises:

updating, based on a memory full state, the default behavior to executing a non-machine learning algorithm, and updating, based on a memory state change from the memory full state, the default behavior to executing a light machine-learning algorithm requiring fewer measurements than the machine learning model;

execute, by the terminal, the default behavior instead of the machine learning model if the terminal is in the inability state;

supervise if the terminal executes and trains the machine learning model and goes into the inability state;

request the network to instruct the terminal to stop executing and training the machine learning model if the terminal executes and trains the machine learning model and the terminal goes into the inability state;

monitor if the terminal receives an instruction to execute and train the machine learning model;

reject the instruction to execute and train the machine learning model if the terminal receives the instruction and the terminal is in the inability state;

monitor whether the terminal goes from the inability state to the ability state; and inform the network that the terminal is in the ability state if the terminal indicated the capability and the terminal goes from the inability state to the ability state, wherein the terminal is in the inability state if all of the following conditions are fulfilled:

a battery of the terminal is charged below a predefined threshold, a memory available for the executing and training of the machine learning model is less than a predefined memory threshold for the machine learning model, and a processing power for the executing and training of the machine learning model is less than a predefined processing power threshold for the machine learning model.

* * * * *